V. LANCIA.
AUTOMOBILE.
APPLICATION FILED NOV. 21, 1919.

1,372,148.

Patented Mar. 22, 1921.
2 SHEETS—SHEET 1.

Inventor:
Vincenzo Lancia,
by Fear Middleton Donaldson & Hall
Attys.

V. LANCIA.
AUTOMOBILE.
APPLICATION FILED NOV. 21, 1919.
1,372,148.
Patented Mar. 22, 1921.
2 SHEETS—SHEET 2.
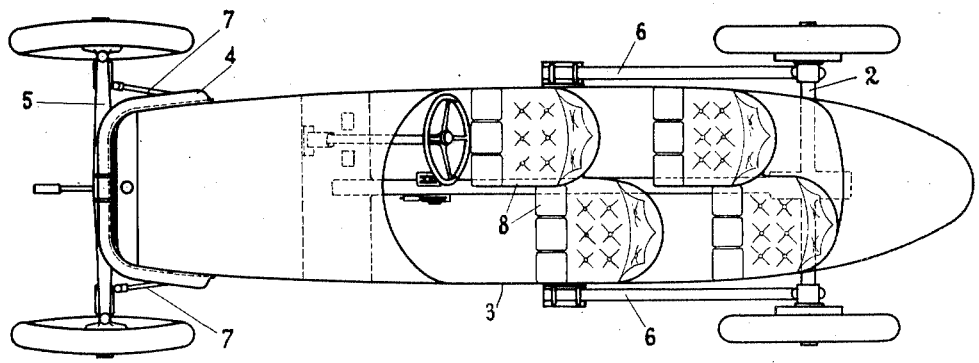
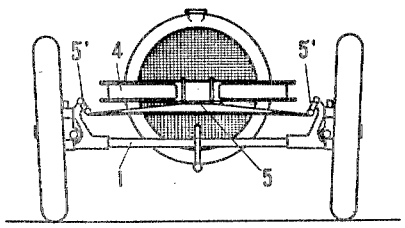
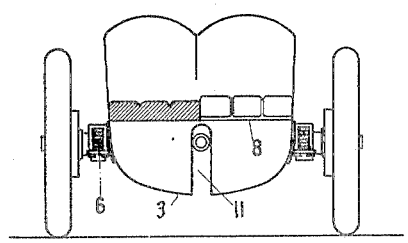
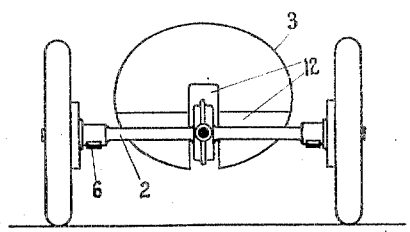
Inventor:
Vincenzo Lancia.

UNITED STATES PATENT OFFICE.

VINCENZO LANCIA, OF TURIN, ITALY.

AUTOMOBILE.

1,372,148.  Specification of Letters Patent.  Patented Mar. 22, 1921.

Application filed November 21, 1919. Serial No. 339,743.

*To all whom it may concern:*

Be it known that I, VINCENZO LANCIA, a subject of the King of Italy, and residing at Turin, Italy, have invented certain new and useful Improvements in Automobiles, of which the following is a specification.

The present invention relates to motor cars in which the front and the rear axles are connected together by the body of the carriage which consists of a rigid shell affording space for the engine and the seats.

The object of the present invention is to construct a carriage body so that it may be nearer the ground and yet enable the various parts to be easily accessible and at the same time increase the rigidity of the body.

According to the invention the carriage body is formed of a shell of stamped sheet metal which is provided on its underside with a longitudinal channel to clear the driving shaft between the engine and the rear axle, and with a transverse channel to clear the rear axle and differential gear.

Figure 1:
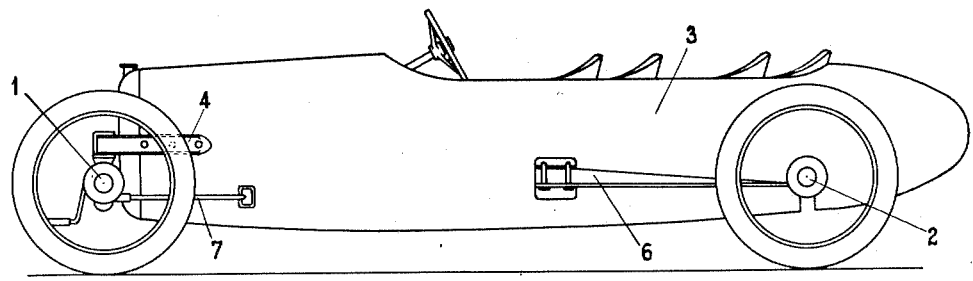
Figure 2:
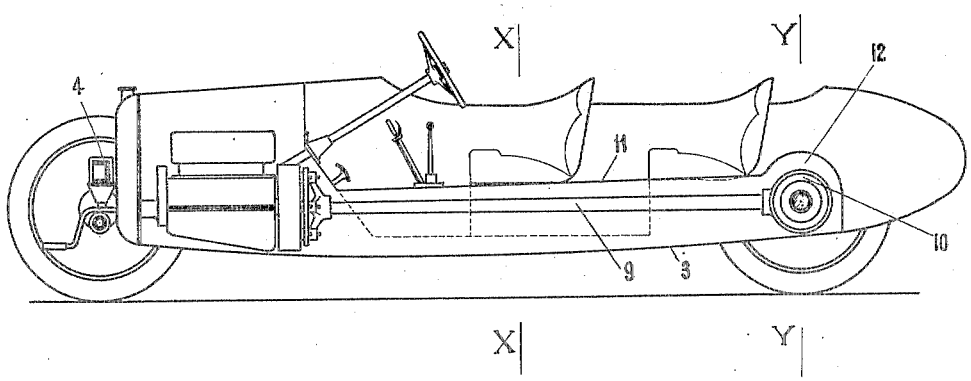

The annexed drawings show by way of example a construction of automobile according to this invention and Figure 1 is the side view of the same; Fig. 2 is the longitudinal section; Fig. 3 is the plan view; Fig. 4 is the front view; Figs. 5 and 6 are the transverse sections on $x$—$x$ and $y$—$y$ (Fig. 2) respectively.

As shown by said figures to front axle 1 and rear axle 2 is suspended a stiff shell 3 which preferably is made of stamped steel sheet and forms at the same time the vehicle frame and body.

Said shell is suspended in a resilient manner to the axles by means of springs as shown in the drawing; in said construction the shell 3 is provided at its front end with a stirrup 4 to which is secured a semi-elliptical spring 5 lying above the front axle 1 and connected by its ends with said axle by means of links 5'; further said shell is provided with swinging rods 7 suitably connected to shell 3 and to axle 1 and intended to hold said axle in the proper position.

At the sides of shell 3 are secured the blade springs 6 connected by their ends with the rear axle 2.

Within said shell 3 are located the driving and controlling devices for the automobile as well as the passengers' seats; in the case said shell is made of stamped sheet metal as above described said seats may be integral with the shell and in any case the frames 8 of said seats form transverse parts which coöperate to stiffen the shell.

The bottom of shell 3 is provided with a longitudinal channel 11 and with a transverse channel 12 obtained by stamping the sheet metal and intended to provide spaces for the transmission shaft 9 and the differential case 10 as well as for the rear axle 2; said channels may extend upwardly up to the seat level and therefore it is made possible of lowering or bringing down the axis of the shell and therefore the plane of said seats and of the shell bottom to the most reduced distance from the road ground with regard to the wheel axes.

Said longitudinal channel 11, which may be obtained by stamping the sheet metal forming the bottom of the shell, gives rise to a longitudinal rib stiffening and strengthening the shell without materially reducing the free space left within the shell said rib being located at the middle of the shell between the adjacent side seats.

This invention provides a very light construction of vehicles as the same requires a single member or shell instead of the separate frame and body of usual automobiles and said shell may be made of thin metal and have any proper shape to secure the stability of the vehicle and to reduce the resistance offered by air; further said construction provides facilities in mounting and upholding the several automobile parts and devices.

What I claim as my invention and desire to secure by United States Letters Patent is:—

1. In a motor car, a carriage body formed by a shell of stamped sheet metal, the underside of which is provided with a longitudinal channel to clear the transmission shaft between the engine and the rear axle.

2. In a motor car, a carriage body formed by a shell of stamped sheet metal, the underside of which is provided with a longitudinal channel to clear the transmission shaft between the engine and the rear axle, and a transverse channel near its rear end to clear the rear axle and differential gear.

In testimony whereof I have signed my name to this specification.

VINCENZO LANCIA.